United States Patent
Isgar

(10) Patent No.: US 12,155,881 B2
(45) Date of Patent: Nov. 26, 2024

(54) LOCATION BASED VIDEO SYSTEM WITH AI INTEGRATION

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 406 days.

(21) Appl. No.: 17/710,423

(22) Filed: Mar. 31, 2022

(65) Prior Publication Data

US 2022/0232274 A1  Jul. 21, 2022

Related U.S. Application Data

(63) Continuation-in-part of application No. 17/697,307, filed on Mar. 17, 2022, which is a continuation-in-part of application No. 17/555,672, filed on Dec. 20, 2021, now Pat. No. 11,725,961, which is a continuation of application No. 16/706,698, filed on Dec. 7, 2019, now Pat. No. 11,204,255.

(60) Provisional application No. 62/776,514, filed on Dec. 7, 2018.

(51) Int. Cl.
*H04N 21/258* (2011.01)
*G06F 16/958* (2019.01)
*H04N 21/2668* (2011.01)
*H04N 21/482* (2011.01)

(52) U.S. Cl.
CPC ... *H04N 21/25841* (2013.01); *H04N 21/2668* (2013.01); *H04N 21/4826* (2013.01)

(58) Field of Classification Search
CPC ............ G01C 21/3682; G01C 21/3476; G01C 21/3644; G01C 21/3679; G01C 21/3697; G06F 16/29; G06F 16/487; G06F 16/9537; H04W 4/021; H04W 4/185; H04W 4/023
See application file for complete search history.

(56) References Cited

U.S. PATENT DOCUMENTS

| | | | |
|---|---|---|---|
| 8,135,624 B1 | 3/2012 | Ramalingam et al. | |
| 9,401,771 B2 | 7/2016 | Macleod et al. | |
| 9,841,814 B1 | 12/2017 | Kallmeyer et al. | |
| 11,204,255 B2 * | 12/2021 | Isgar .................. | G01C 21/3644 |

(Continued)

OTHER PUBLICATIONS

Isgar, Charles, Travel-Based Geo-Paired Information System, Patent Cooperation Treaty Application Serial No. PCT/US2020/063594, filed Dec. 7, 2020, International Search Report and Written Opinion dated Jan. 21, 2021.

*Primary Examiner* — Joseph E Dean, Jr.
(74) *Attorney, Agent, or Firm* — Schmeiser, Olsen & Watts LLP

(57) ABSTRACT

Described is a location based video system. The system includes a server having a memory storing user information and a user computing device coupled to the server. The user computing device operates an application to couple the user computing device to the server and to provide access to the location based video system. The server may be programmed to receive location information from the user computing device and determine a predetermined distance from the user computing device for searching for location tagged video content within the predetermined distance from the user computing device. The server may also be programmed to retrieve from an Internet source, the location tagged video content and send the video content for display and selection on the user computing device. The location tagged video content may then be played on the user computing device.

12 Claims, 24 Drawing Sheets

(56) References Cited

U.S. PATENT DOCUMENTS

| | | | |
|---|---|---|---|
| 2010/0306211 A1* | 12/2010 | Chaudhuri | G06F 16/29 |
| | | | 707/753 |
| 2014/0248911 A1 | 9/2014 | Rouda, Jr. | |
| 2015/0052131 A1* | 2/2015 | Suzuki | H04L 67/52 |
| | | | 707/736 |
| 2015/0289093 A1 | 10/2015 | Petty et al. | |
| 2018/0112996 A1 | 4/2018 | Montell | |
| 2018/0192144 A1 | 7/2018 | Mcelroy | |

* cited by examiner

LOCATION BASED VIDEO SYSTEM WITH AI INTEGRATION

CROSS REFERENCE TO RELATED APPLICATION[S]

This application is a continuation-in-part of U.S. patent application Ser. No. 17/697,307, filed Mar. 17, 2022, which is a continuation-in-part of U.S. patent application Ser. No. 17/555,672, filed Dec. 20, 2021, which is a continuation of U.S. patent application Ser. No. 16/706,698, filed Dec. 7, 2019, which claims priority to U.S. Provisional Patent Application Ser. No. 62/776,514, filed Dec. 7, 2018, the disclosure of which is hereby incorporated entirely herein by reference.

BACKGROUND OF THE INVENTION

Technical Field

This invention generally relates to video systems providing content to individuals, and specifically to a location based video system for providing video content to individuals based on the location of the individual and the location the video content was created.

State of the Art

Individuals who travel an extended distance often do so in cars, trains, planes or the like. Generally, long-distance travel includes travel through various parts of a state, region or country. Many travelers utilize videos as a form of entertainment during travel. However, this entertainment does not correlate to the route traveled or the location of the user. Further, many individuals engage in watching of videos on various platforms to pass time or for entertainment while at home, at work on breaks or other locations. There is a lack of systems or devices that can allow an individual to obtain information based on where the user is located.

Accordingly, what is needed is an location based video system for individuals to view video based on his or her location and the location the video content was created.

SUMMARY OF THE INVENTION

An embodiment includes a location based video system comprising: a server having a memory storing user information; and a user computing device coupled to the server, the user computing device operating an application to couple the user computing device to the server and to provide access to the location based video system, wherein the server is programmed to: receive location information from the user computing device; determine a predetermined distance from the user computing device for searching for location tagged video content within the predetermined distance from the user computing device; retrieve from an Internet source, the location tagged video content within the predetermined distance from the user computing device; send for display on the user computing device, the location tagged video content retrieved for selection by the user; and automatically send instruction to stream the location tagged video content on the user computing device through a network connection, in response to receiving a selection of the location tagged video content from the user computing device.

Another embodiment includes a method of using a location based video system comprising: sending location information from a user computing device to a server; determining, by the server, a predetermined distance from the user computing device for searching for location tagged video content within the predetermined distance from the user computing device; retrieving, by the server from an Internet source, the location tagged video content within the predetermined distance from the user computing device; sending, by the server, a user interface for display on the user computing device comprising the location tagged video content retrieved for selection by the user; and automatically streaming the location tagged video content on the user computing device through a network connection, in response to a selection of the location tagged video content through the user computing device.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a locating based video system wherein video content is provided to individuals based on the location of the individual's computing device and the location the video content was created.

Figure 1A:
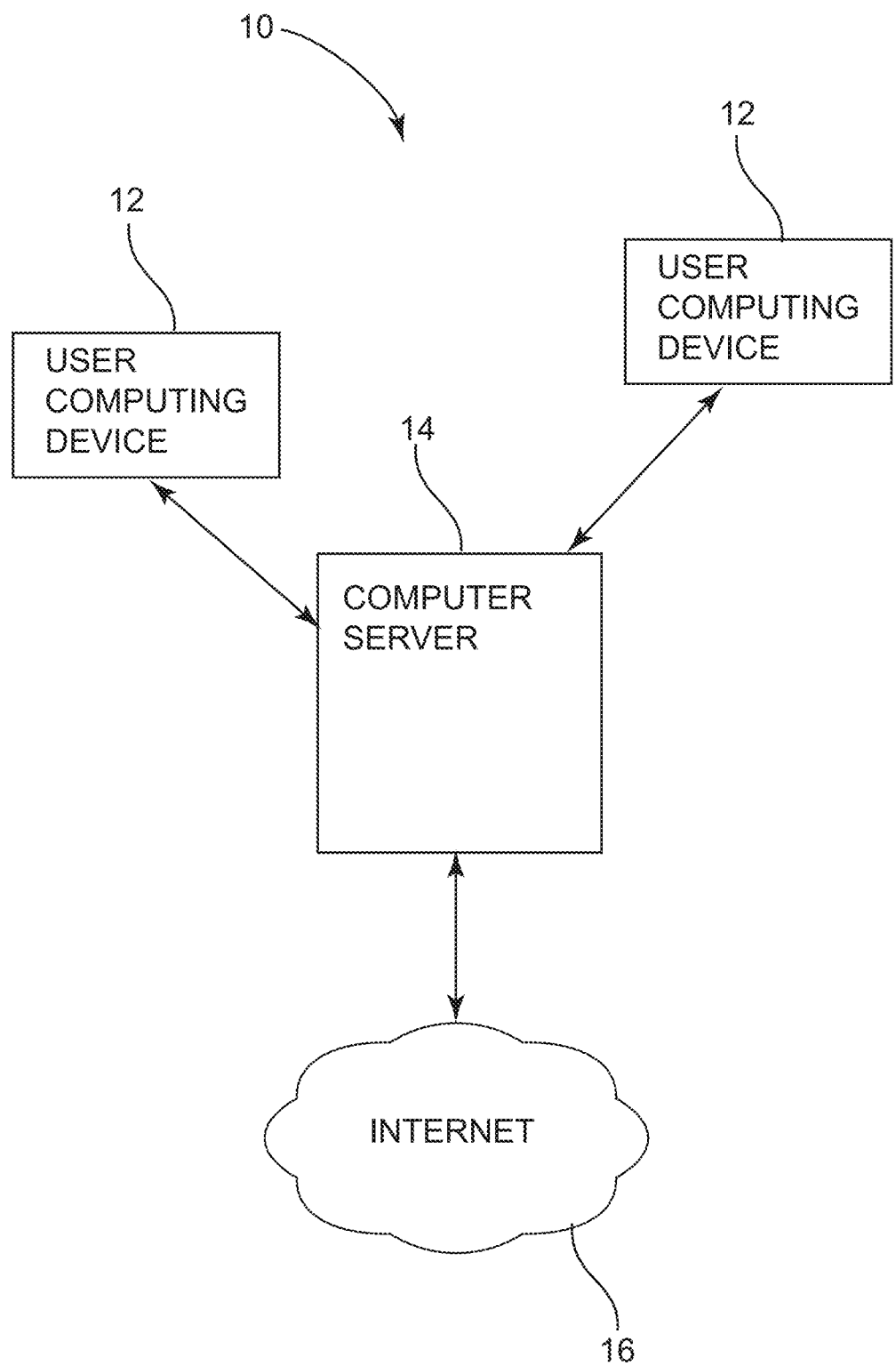
FIG. 1A is a diagrammatic view of a location based video system according to an embodiment.
Figure 1B:
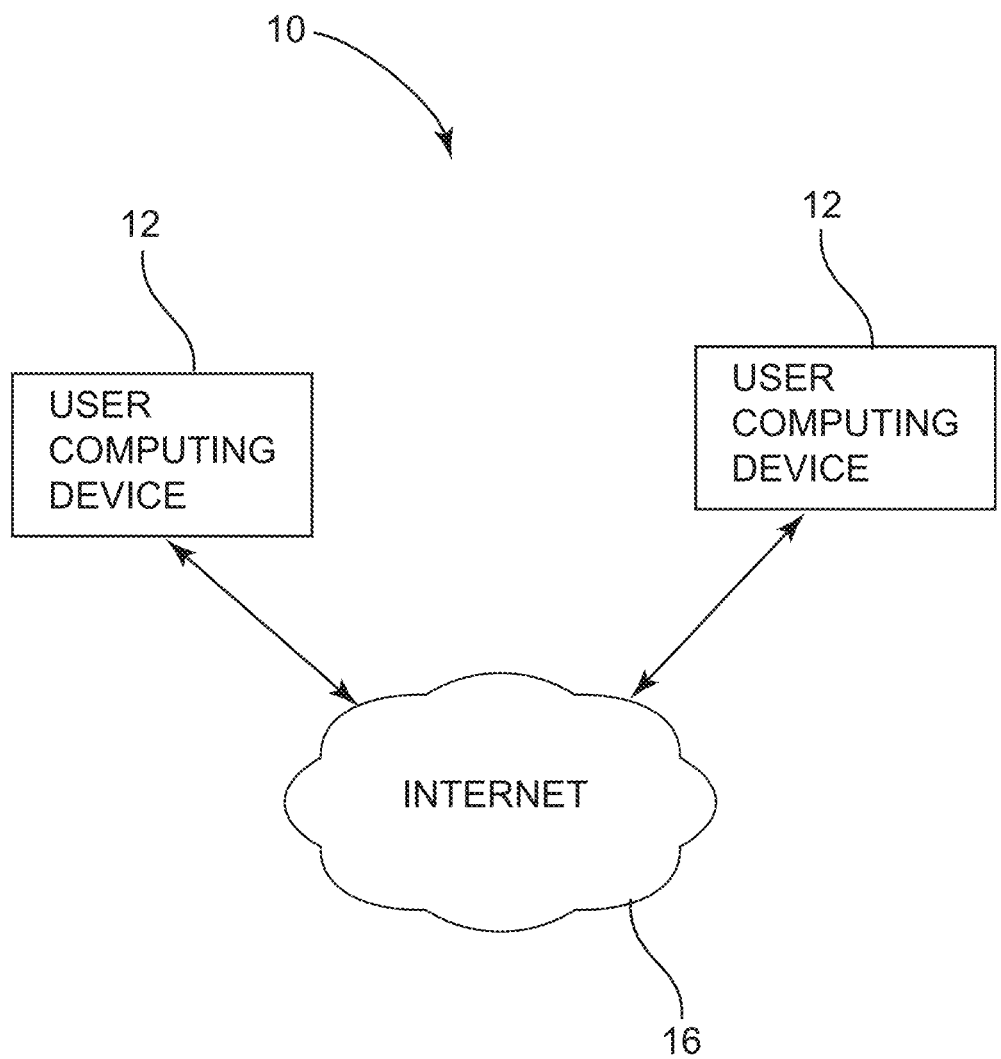
FIG. 1B is another diagrammatic view of a location based video system according to an embodiment.

FIG. 1A depicts a system 10 may include user computing devices 12 and a server 14, wherein each user computing device 12 is coupled to the computer server 14. This coupling may be a network connection, such as through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a cloud-based infrastructure architecture. The system 10 may also include the server 14 coupled to, or having access to, the Internet 16, wherein the server may access content located on the Internet 16 as part of the operation of the system 10. In other embodiments, as shown in FIG. 1B, the user computing devices 12 may be coupled directly to the Internet 16 and the operations of the system described as programming on the server 14, may be stored and operated on the user computing device 12.

The server 14 may include a memory storing various data including, but not limited to, user information, such as login information, user preferences, including a predetermined distance or location range from the user computing device location the user wishes the system 10 to search for video content (see FIG. 2), temporary location information of the user based on location of the user computing device 12 and so forth.

Figure 2:
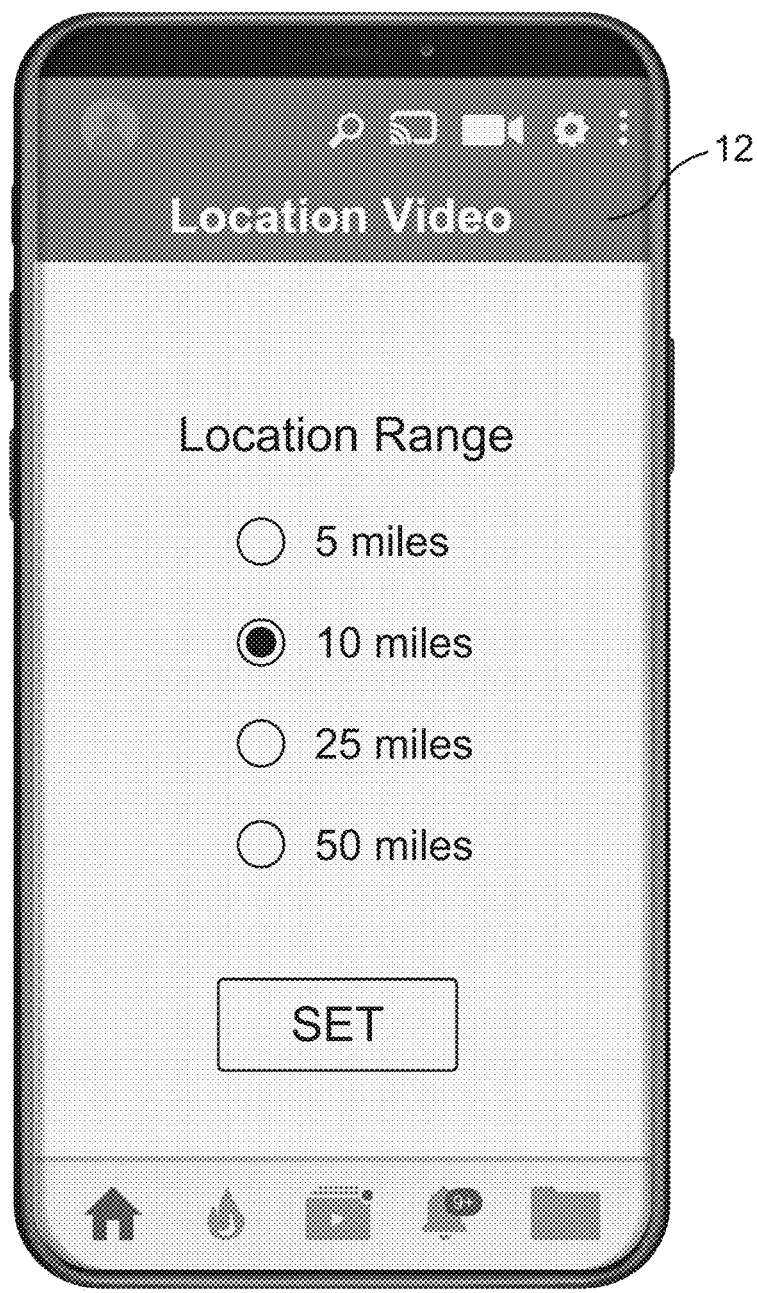
FIG. 2 depicts a user computing device of a location based video system according to an embodiment.
Figure 3:
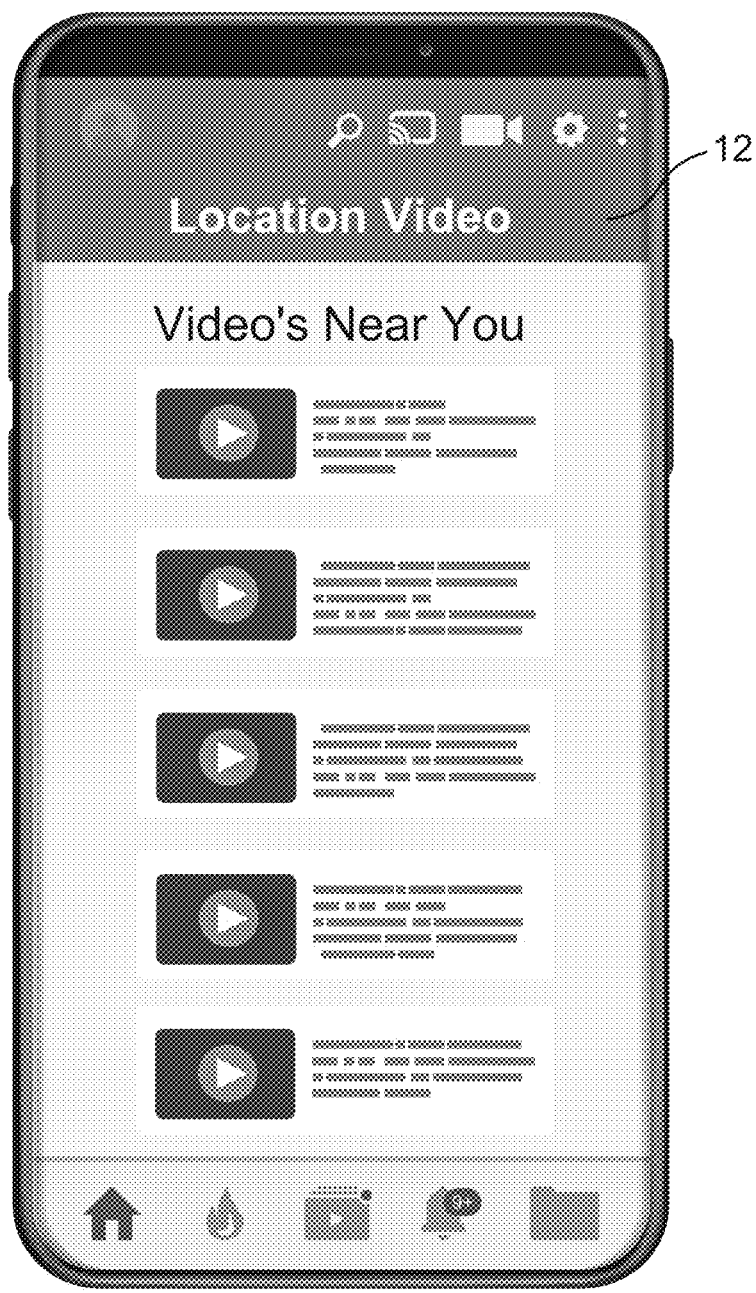
FIG. 3 depicts a user computing device of a location based video system according to an embodiment.
Figure 4:
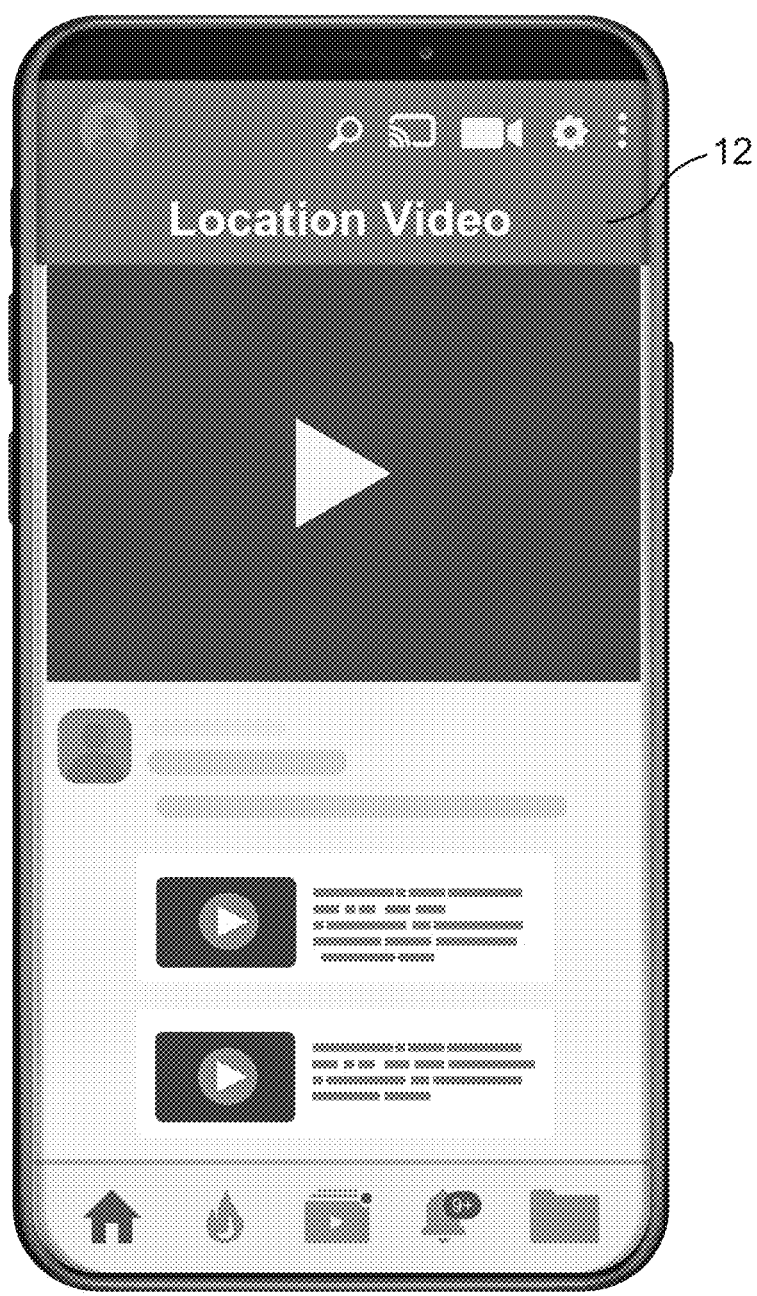
FIG. 4 depicts a user computing device of a location based video system according to an embodiment.
Figure 5:
FIG. 5 depicts a user computing device of a location based video system according to an embodiment.
Figure 6:
FIG. 6 depicts a user computing device of a location based video system according to an embodiment.

The system 10 may operate to provide location tagged video content that is Internet video content corresponding to the geo-location of the user computing device 12. For example, and without limitation, the location tagged video content sent by the server 14 for presentation on the user computing device 12 may be various Internet based video from online video platforms or social media platforms, such as YouTube, Facebook, Instagram, TikTok, Twitter and so forth. Further, the location tagged video content sent by the server 14 for presentation on the user computing device 12 may be based on the location of the user computing device 12 and corresponding to the location tag applied to the video content. The user may set a radius or location range that sets the boundary around the user computing device 12 that the system 10 will search for corresponding geo-paired information/content, such as 5 miles, 10 miles, 25 miles, 50 miles and the like, as shown in FIG. 2. The server 14 may be programmed to receive the location of the user computing device 12 and then search the Internet 16 for location tagged video content corresponding to the location of the user computing device 12 and within the location range established by the user. The Internet 16 may include sources, such as YouTube, Facebook, Instagram, TikTok, Twitter and the like. The server 14 may then send for display on the user computing device 12 one or more selectable location tagged videos associated with or corresponding to the location of the user computing device 12, as depicted in FIG. 3. The user may then select a particular location tagged video, as depicted in FIG. 4, in order to play the video on the user computing device 12. Another example is depicted in FIGS. 5 and 6, wherein the server 14 sends for display on the user computing device 12 one or more selectable location tagged videos associated with or corresponding to the location of the user computing device 12, such as Omaha as shown in FIG. 5. The videos may include location tagged videos associated with the location, such as those shown as "Omaha—10 places you NEED to see", "Local Chatter", and "Trending in Omaha", and the videos may also include location tagged videos that also correspond with the stored user preferences, such as those shown as "Food in Omaha", "Sports in Omaha", "Entertainment in Omaha", and "Your Local Crew—Classic Car Club". The user may then select a particular location tagged video, as depicted in FIG. 6, in order to play the video on the user computing device 12, such as trending in Omaha.

Figure 7A:
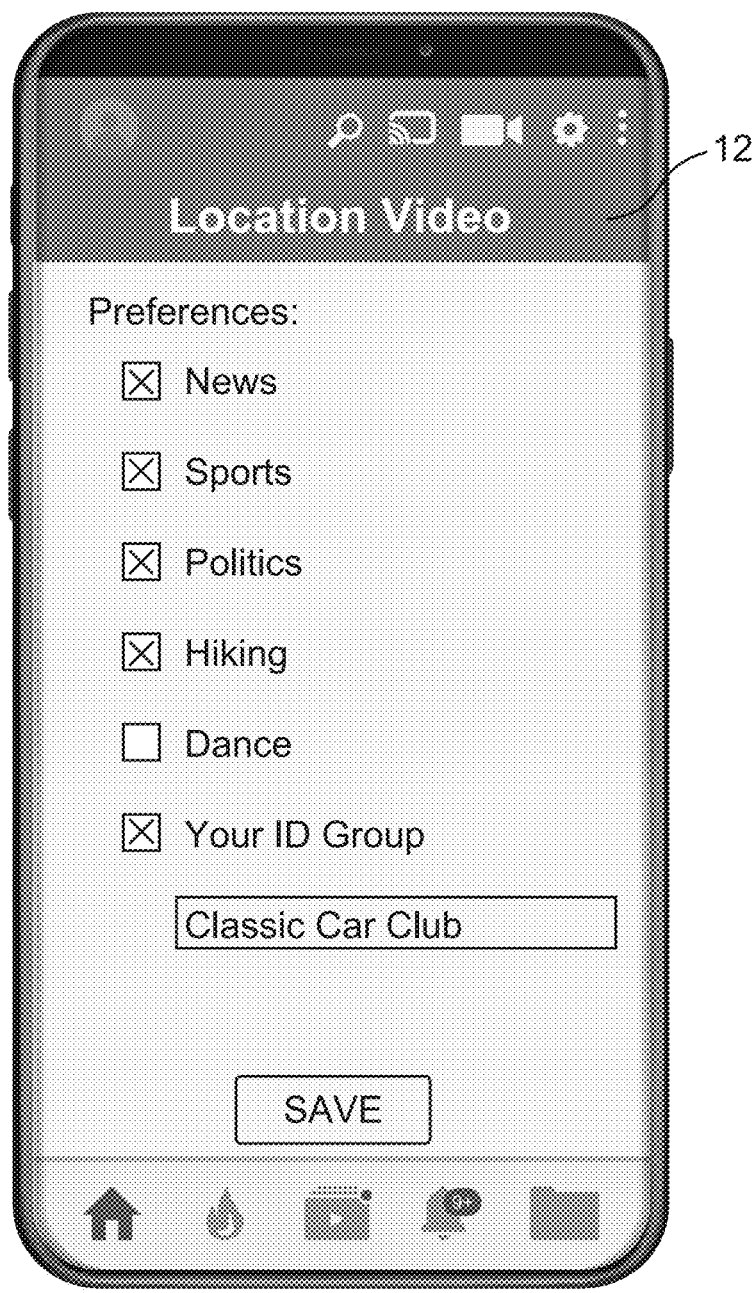
FIG. 7A depicts a user computing device of a location based video system according to an embodiment.
Figure 7B:
FIG. 7B depicts a user computing device of a location based video system according to an embodiment.
Figure 7C:
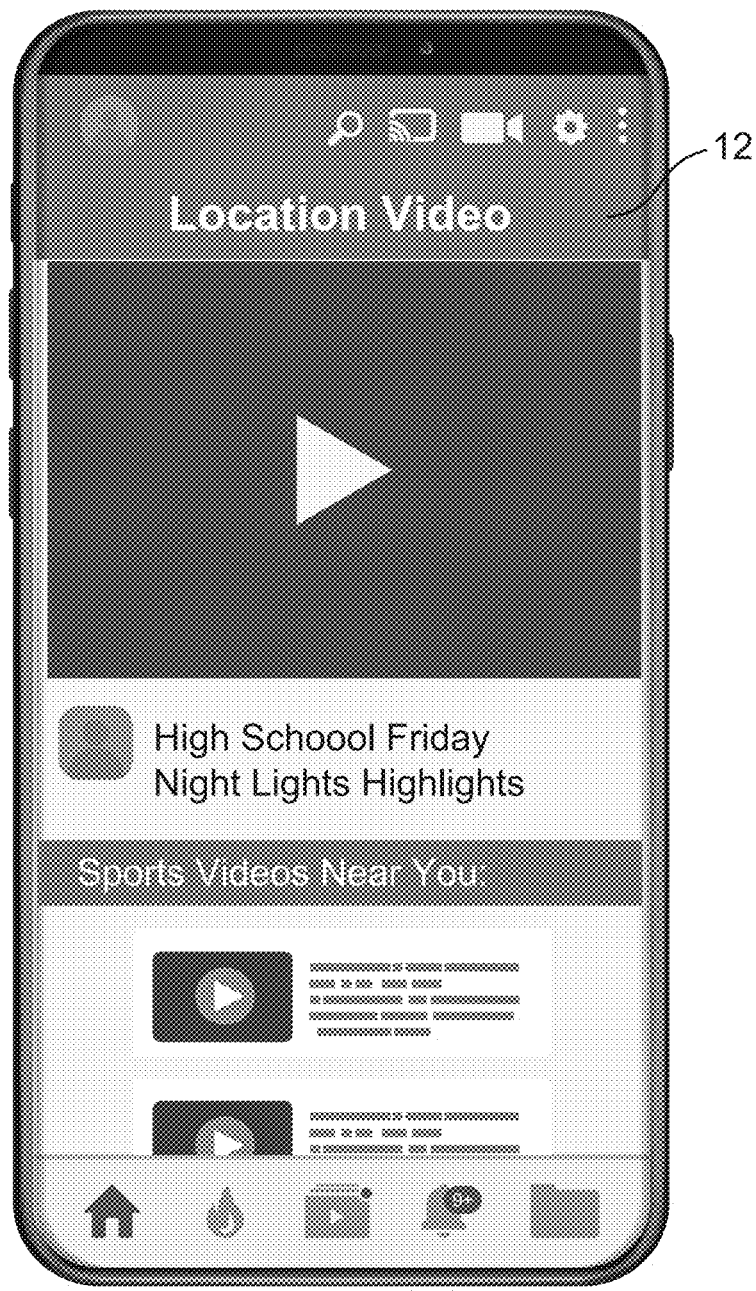
FIG. 7C depicts a user computing device of a location based video system according to an embodiment.

FIGS. 7A-7C depict another example of how user preferences operate. FIG. 7A depicts the user computing device 12 with a user interface allowing the user to enter preferences, such as, but not limited to, News, Sports, Politics, Hiking, Dance, and Your ID Group that allows the user to enter a specific ID group such as "Classic Car Club". These are just example of preferences, any number of preferences may be provided by the server 14 to the user computing device 12 for selection by the user. The system 10 may then include the server 14 programmed to customize the video content sent to the user computing device 12 for selection. For example, the location tagged video content may include content related to the preferences selected and location of the user computing device 12 within the predetermined range of the user computing device 12. As shown in FIG. 7B, the content may include "High School Friday Night Lights Highlights", "City Council Debate—Winners and Losers", "Your Local Crew—Classic Car Club", and "Breaking News". Additionally, the system 10 may operate wherein the server 14 may provide various videos that are randomly selected not necessarily corresponding to the user preferences, such as depicted in FIG. 7B as "Surprise Me". The user may select a video to view, such as "High School Friday Night Lights Highlights" shown in FIG. 7C. The server 12 may further be programmed to send instruction to automatically stream the selected video content. Further, the server 12 may also send other related video content based on location of the user computing device 12, such as "sports videos near you" shown in FIG. 7C.

It will be understood that the operation of the system depicted in FIGS. 7A-7C includes the server 14 operating a programmed algorithm. The algorithm allows the server to receive the location of the user computing device and then access the user information stored in memory of the server to determine the predetermined distance or range from the location of user computing device 12 to search the Internet for location tagged videos within the predetermined range. The algorithm then provides instruction to the server 14 to automatically determine search terms based on the user preferences and automatically search the Internet for location tagged videos within the range based on the search terms established by the server 14 corresponding to the user preferences. Then the server 14 may be programmed as part of the algorithm to send the discovered location tagged video content to the user computing device 12. It will be understood that the algorithm is a smart algorithm operating under artificial intelligence and can determine additional search terms based on past videos watched by the user computing device 12, people followed by the user, and so forth. For example, the user may enter specific group identifying information, such as classic car club shown in FIG. 7A and while the content searched may not include a local classic car club video, the algorithm may search for related terms, such as classic cars and so forth and return video content related to the classic car club.

Figure 8:
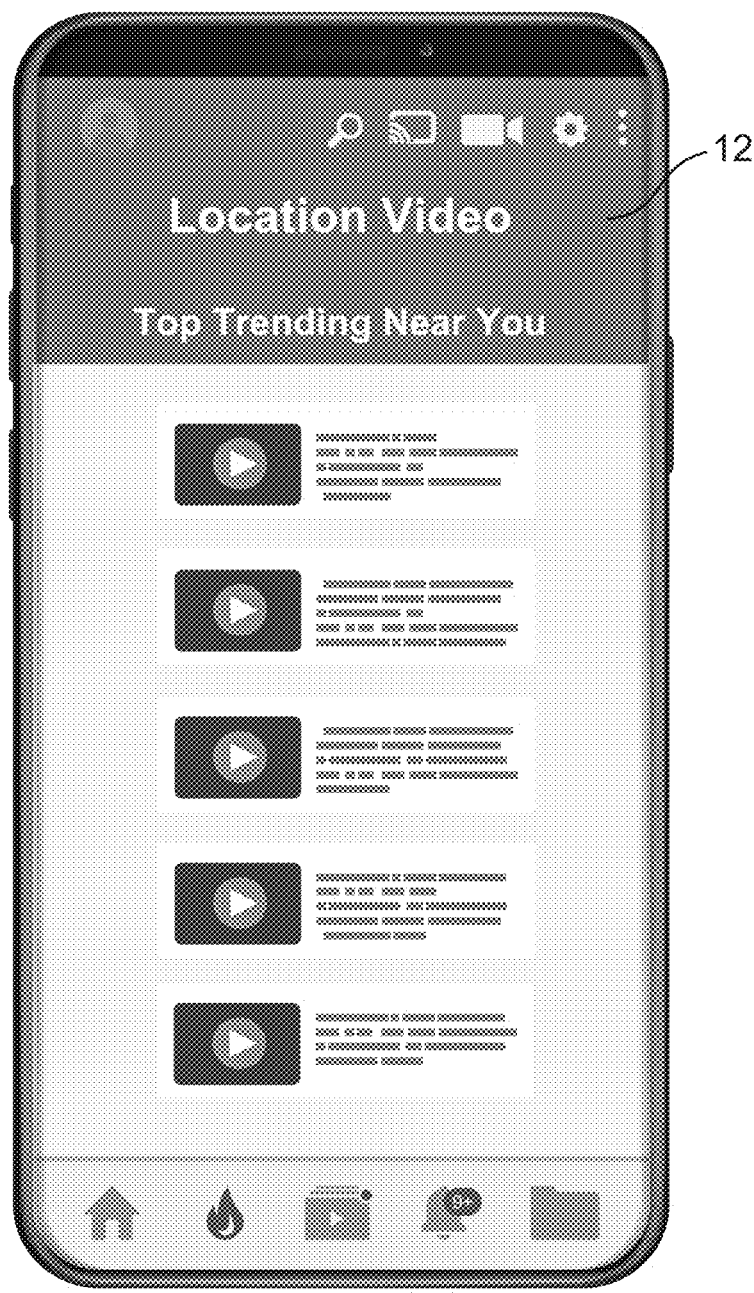
FIG. 8 depicts a user computing device of a location based video system according to an embodiment.
Figure 9:
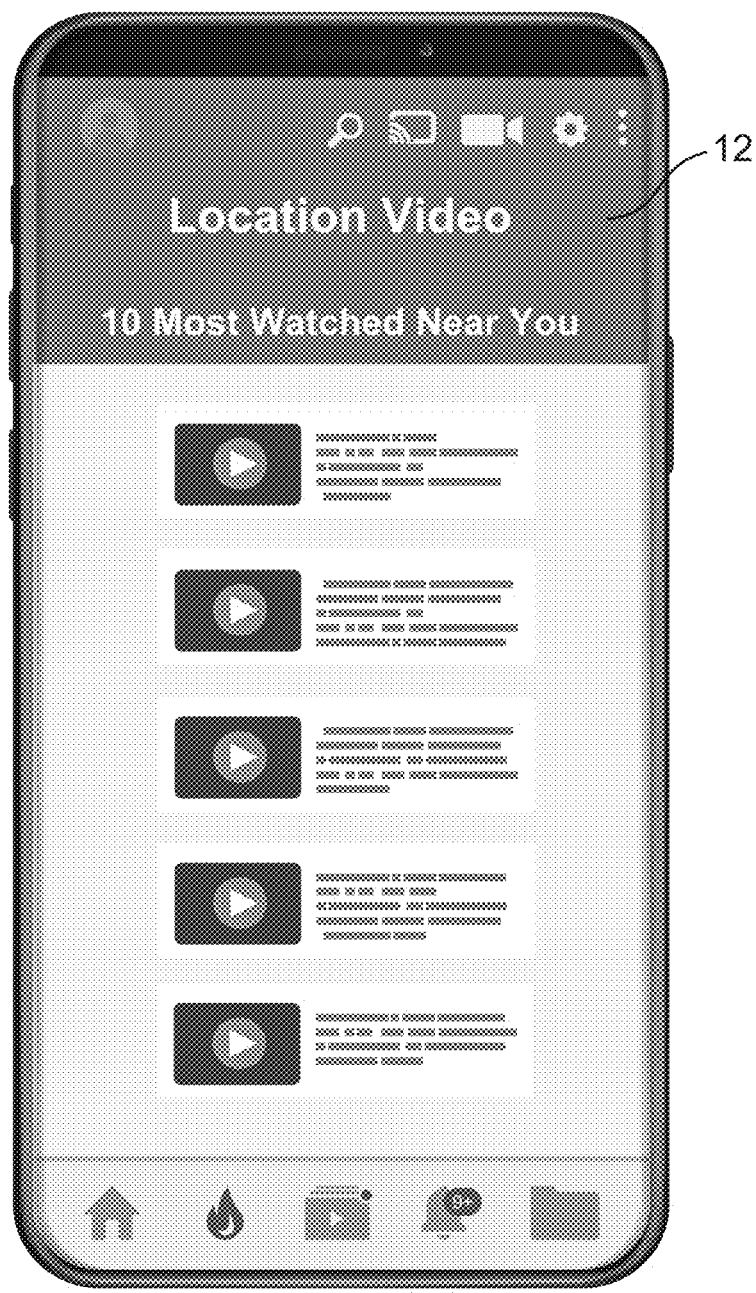
FIG. 9 depicts a user computing device of a location based video system according to an embodiment.

The system 10 may also include the server programmed to send to the user computing device 12 various types of video within the predetermined range of the user computing device 12. For example, and without limitation, it may send or the user may select to see the most trending videos near them (see FIG. 8) or the most watched videos near them (see FIG. 9). This allows the user to just view most popular videos near them.

Figure 10A:
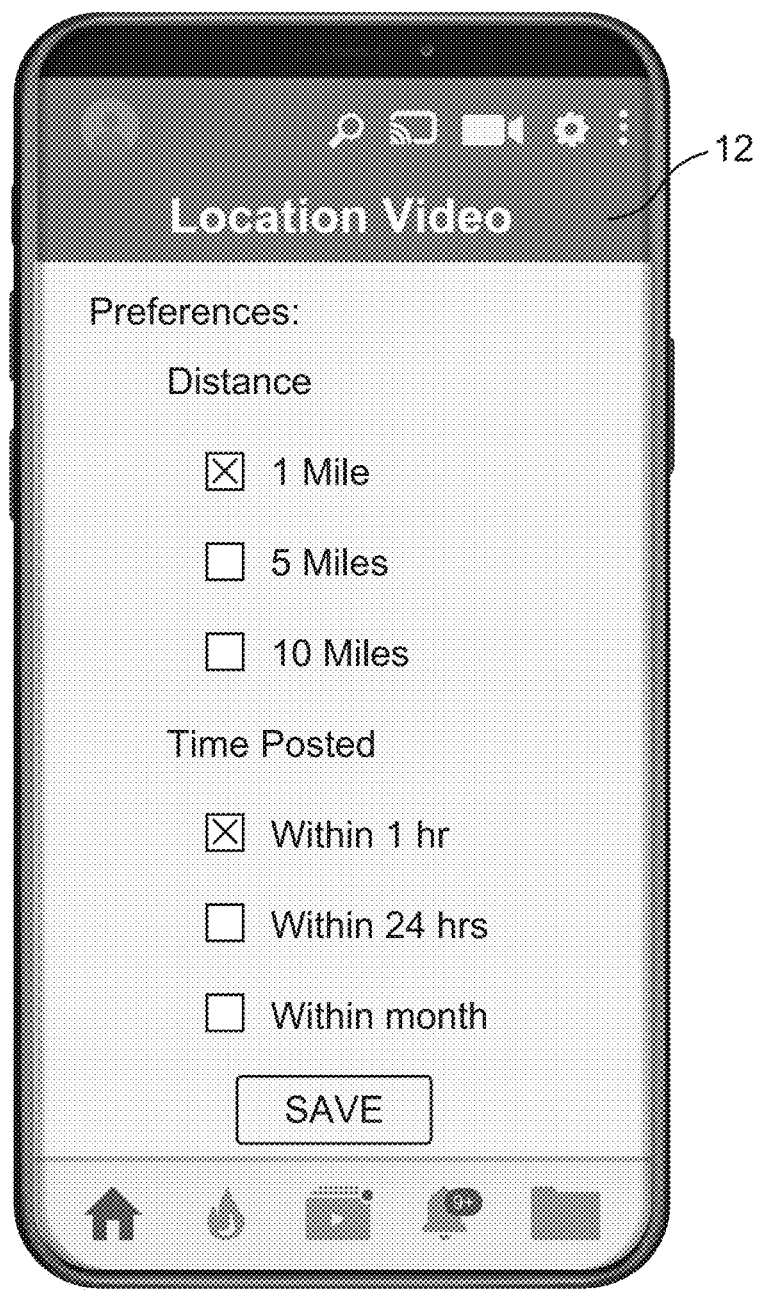
FIG. 10A depicts a user computing device of a location based video system according to an embodiment.

In additional embodiments, the preferences may allow the user, through the user computing device 12 and then stored in memory on the server 14, to include a time frame of when videos are posted as another filter for searching for videos. For example, as shown in FIG. 10A, the user may set the predetermined distance or range for searching and then the time frame that he or she wishes videos posted to pushed to them, such as within 1 hour, within 24 hours, within the month or any time frame. The algorithm will then be adjusted so the server will search for videos within the selected time frame and within the selected predetermined range from the location of the user computing device.

Figure 10B:
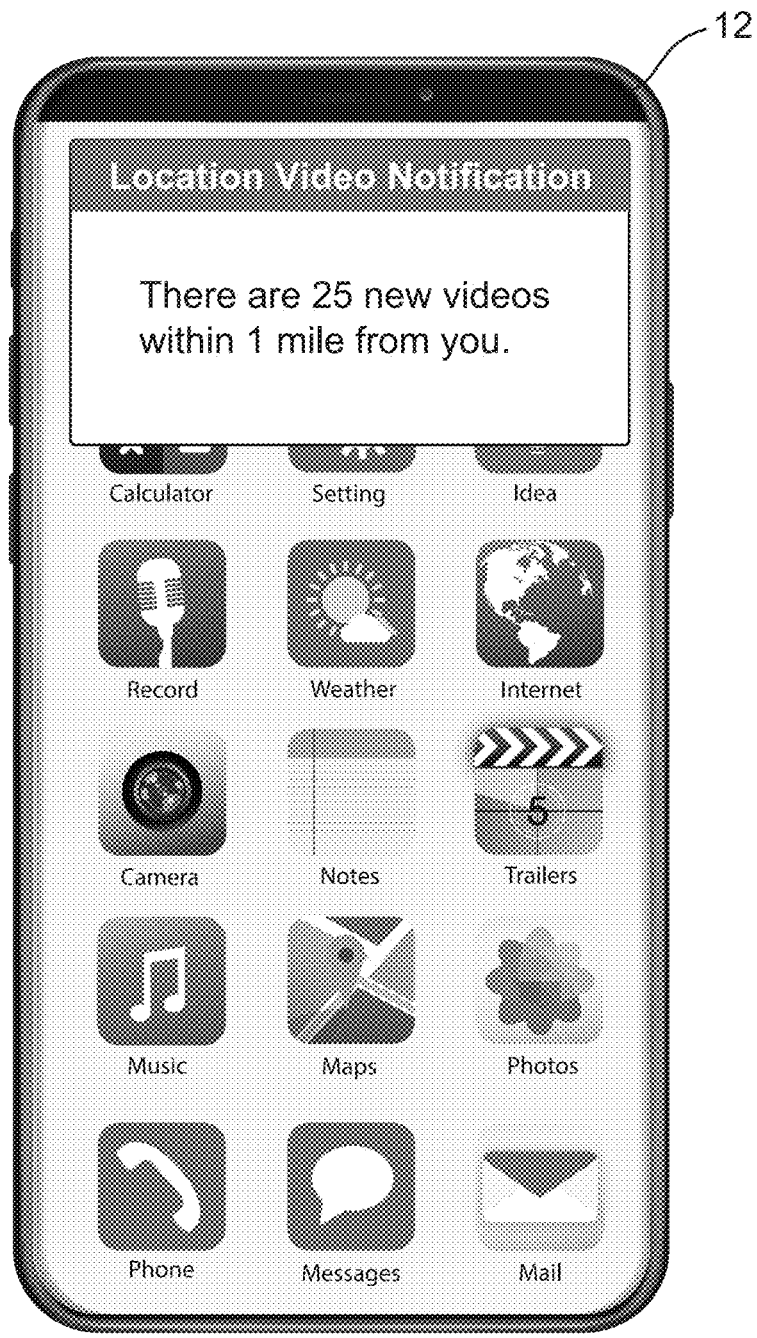
FIG. 10B depicts a user computing device of a location based video system according to an embodiment.

The server 14 may then be programmed to send a notification, such as a push notification shown in FIG. 10B that indicates the server has retrieved videos that meet the timing and predetermined range criteria. The notification may include the number of videos within the distance of the user computing device 12, such as 25 new videos within 1 mile of the user computing device as shown in FIG. 10B.

Figure 10C:
FIG. 10C depicts a user computing device of a location based video system according to an embodiment.

The user may select the notification shown in FIG. 10B and the server 14 may send a user interface with a list of videos retrieved by the server 14. For example, and without limitation, the list of location tagged videos may be from various online and social media sources, such as TikTok, Instagram, YouTube, Facebook, and the like as shown in FIG. 10C. The user may select on the sources, such as TikTok as shown in FIG. 10C.

Figure 10D:
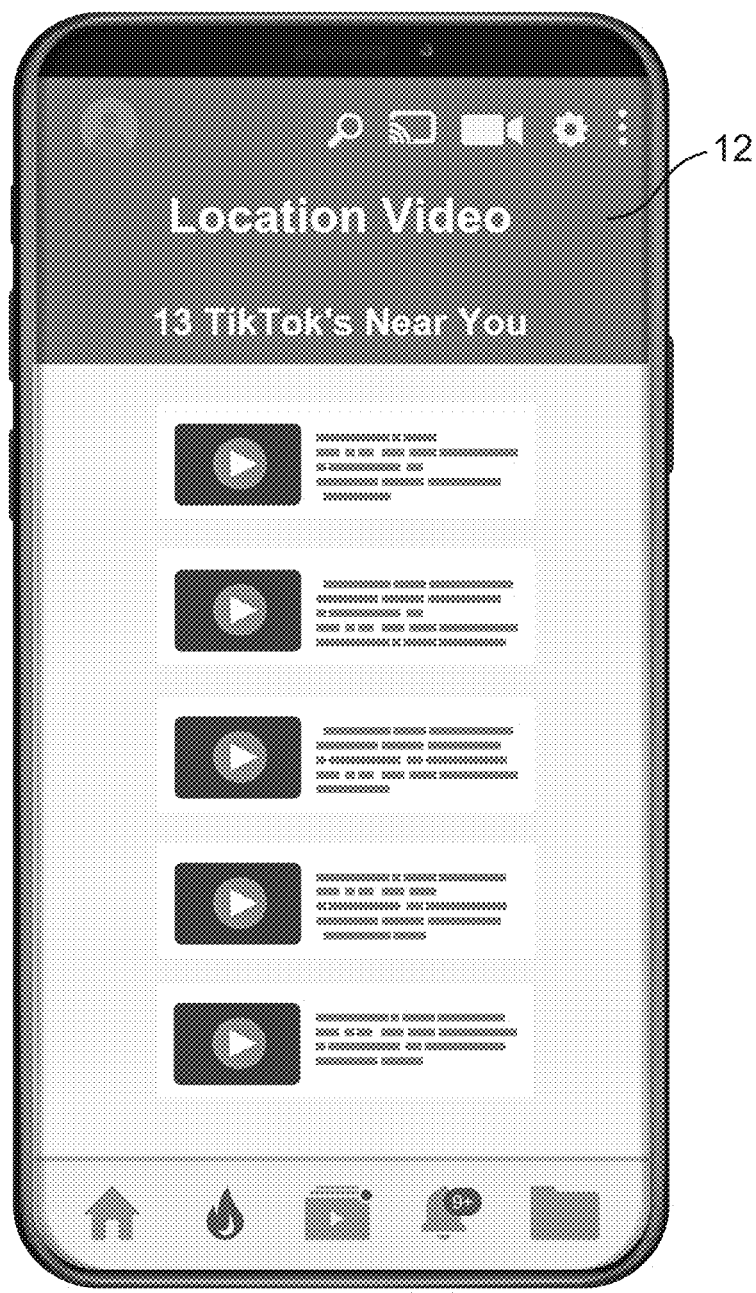
FIG. 10D depicts a user computing device of a location based video system according to an embodiment.
Figure 10E:
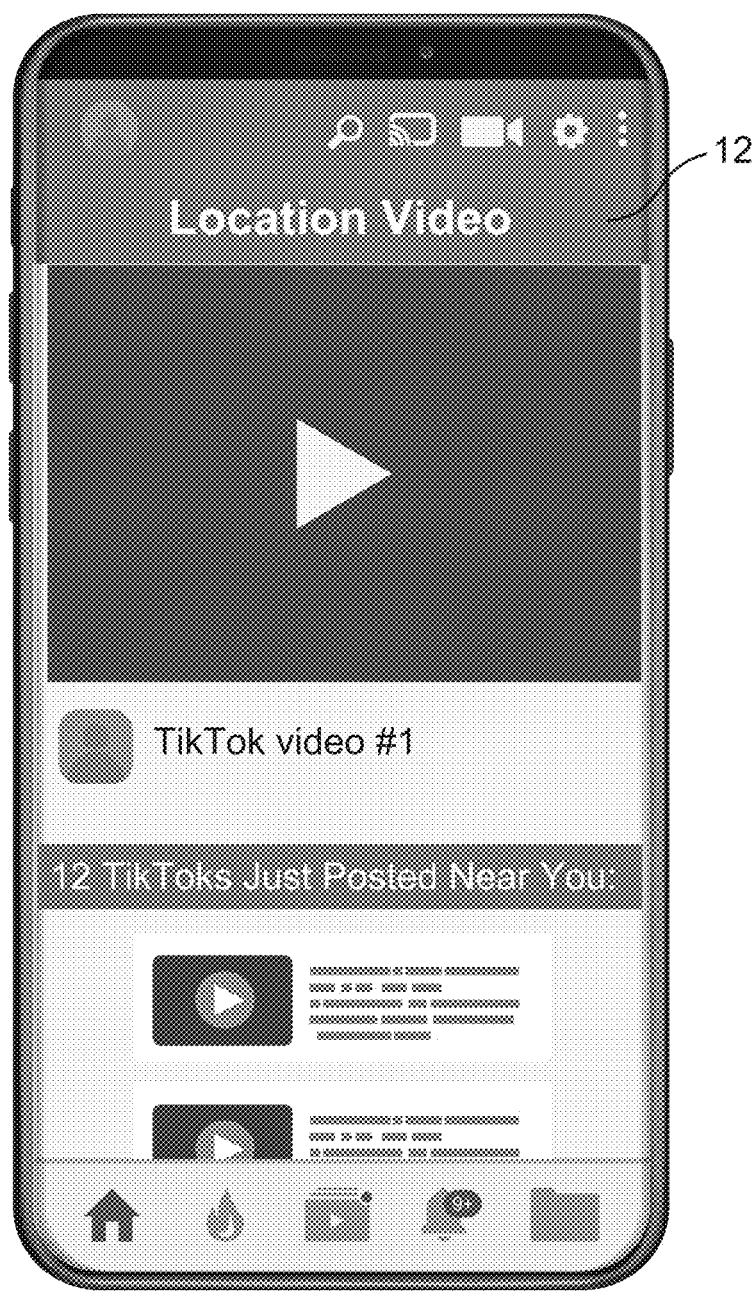
FIG. 10E depicts a user computing device of a location based video system according to an embodiment.

The selection of one of the sources may result in the server 14 programmed to send for display for selection the videos from that source, as shown in FIG. 10D. The user may select one of the videos and the video will stream as shown in FIG. 10E. It will be understood that the system 10 may include an application operating on the user computing device 12 that allows for the location tagged videos to play within the interface of the application without needing to direct the user computing device to play the video on the platform the video was retrieved from. The server 14 may be programmed to do so.

It will be understood that while the system 10 operates an application that draws and plays videos from online sources that are location tagged, some embodiments may be incorporated into a particular platform, such as used with YouTube, TikTok, Instagram, Facebook and the like, wherein the system 10 is a feature of the platform.

Figure 11A:
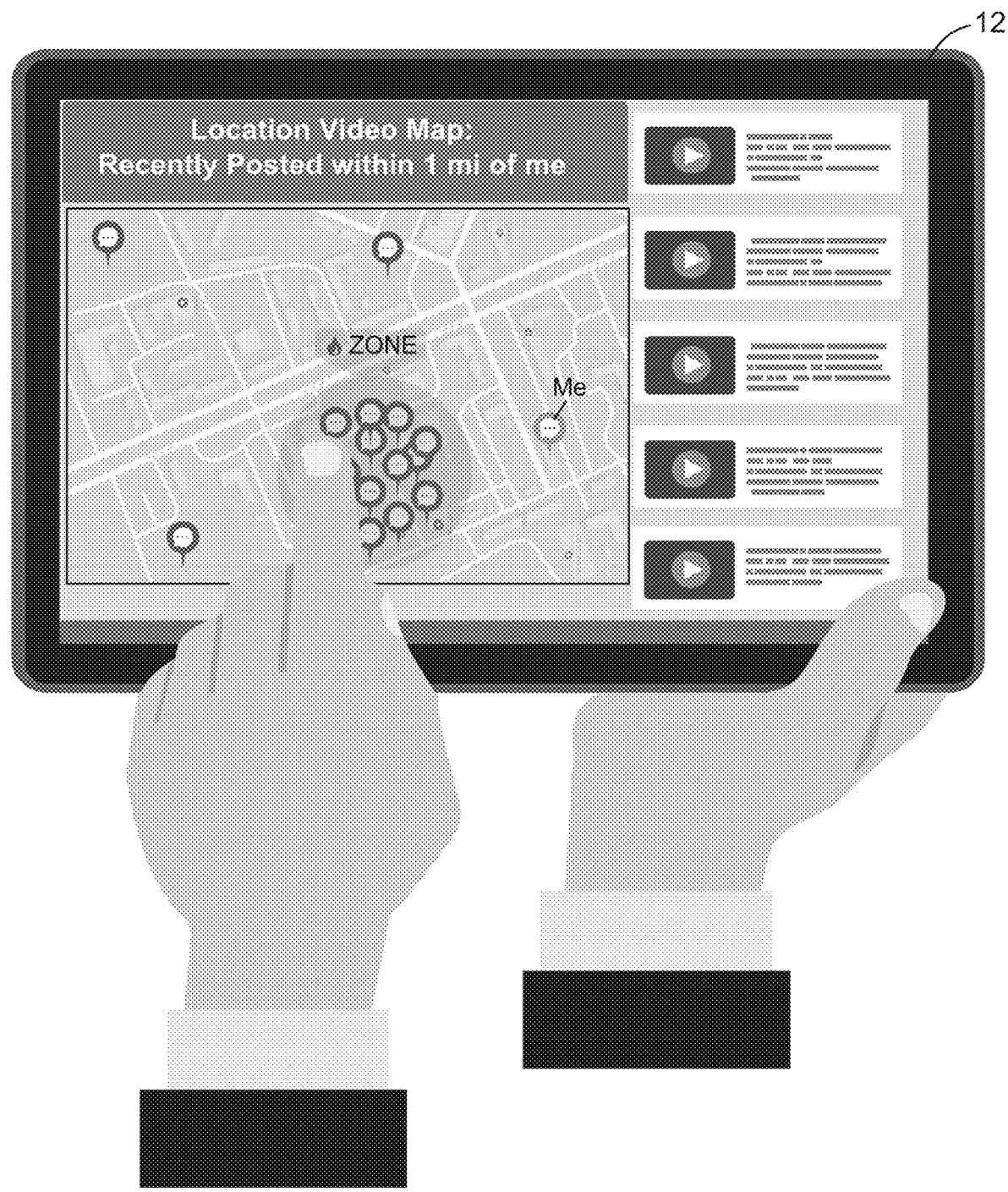
FIG. 11A depicts a user computing device of a location based video system according to an embodiment.
Figure 11B:
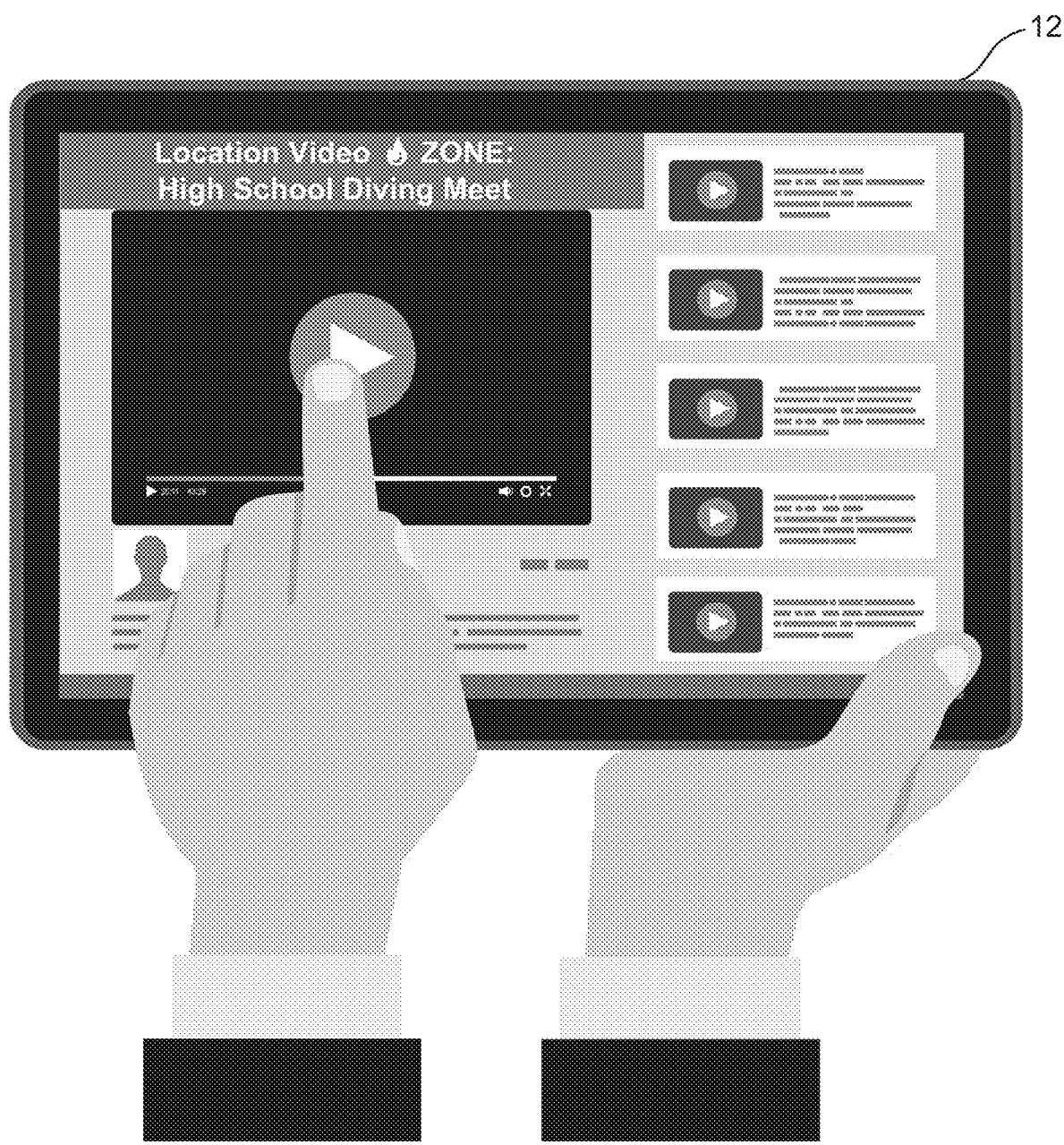
FIG. 11B depicts a user computing device of a location based video system according to an embodiment.

The system 10 may also operate with a map that provides a graphic representation of the location tagged video content within the predetermined distance from the user computing device 12, as shown in FIG. 11A. In embodiments, the map may depict a graphical zone that may be identified as a hot zone where there are several location tagged videos identified on the map as shown in FIG. 11A. The server 14 may receive input from the user through the user computing device 12 selecting the hot zone near the user computing device 12. That brings up the videos at the hot zone, such as videos all corresponding to a high school diving meet as shown in FIG. 11B or any other type of event to common subject for the videos, like a sporting event, a concert, a parade, an amusement park or any other type of event or subject.

Figure 12A:
FIG. 12A depicts a user computing device of a location based video system according to an embodiment.
Figure 12B:
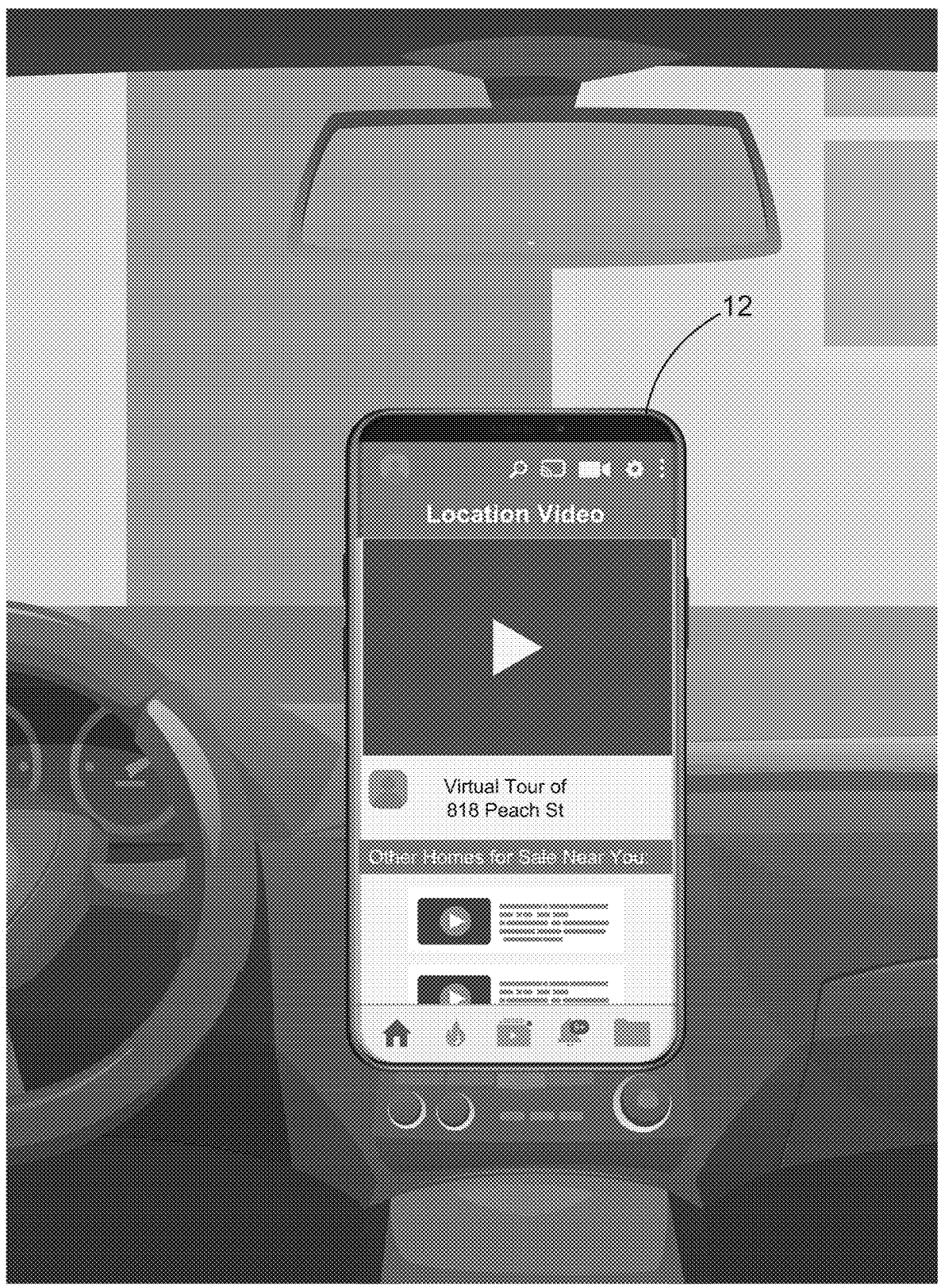
FIG. 12B depicts a user computing device of a location based video system according to an embodiment.

The system 10 may be utilized in real estate applications that may provide video/virtual tours of homes/properties. For example, a user may be traveling in a vehicle and pass a property for sale as shown in FIG. 12A. The system 10 may send for display on the user computing device 12 a location tagged video of the house the vehicle is passing by wherein the user may park and view the video as shown in FIG. 12B. The system 10 may also send other nearby location tagged virtual tours to the user computing device 12 as shown in FIG. 12B.

Figure 13A:
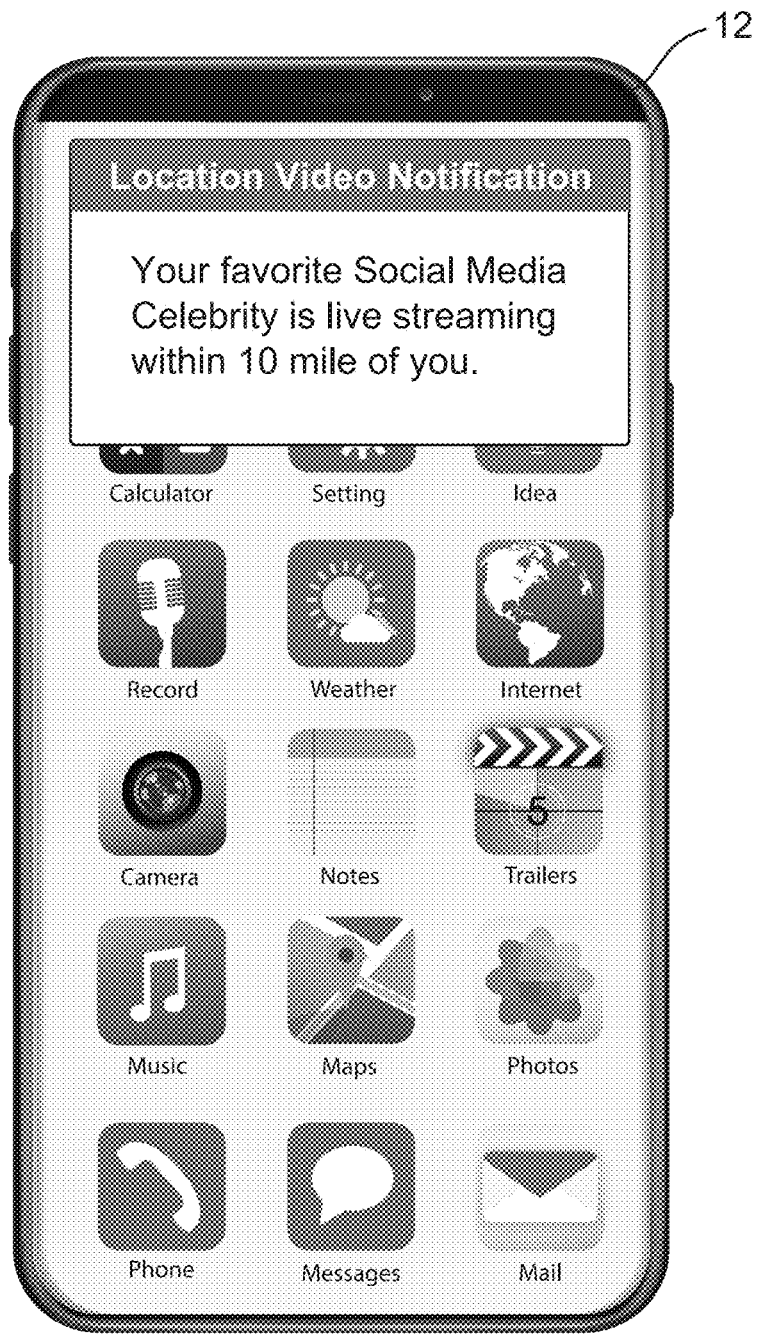
FIG. 13A depicts a user computing device of a location based video system according to an embodiment.
Figure 13B:
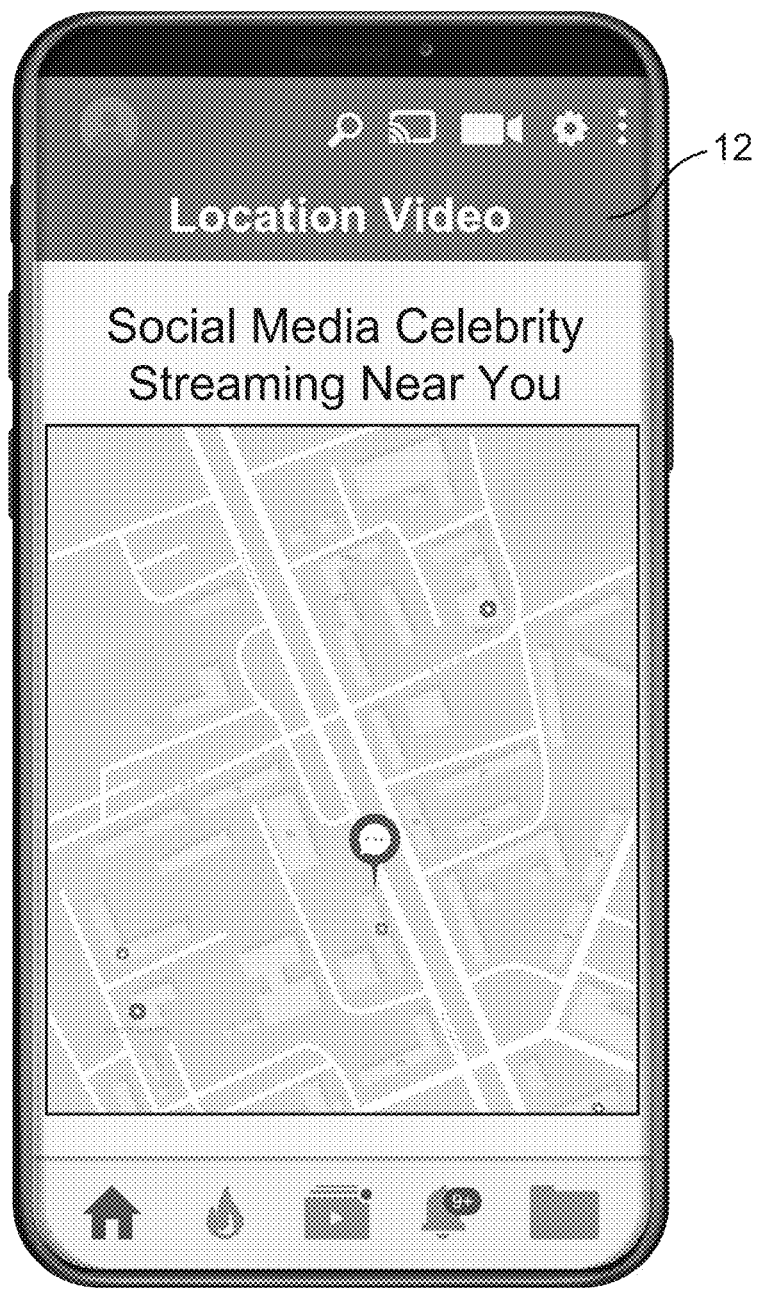
FIG. 13B depicts a user computing device of a location based video system according to an embodiment.
Figure 13C:
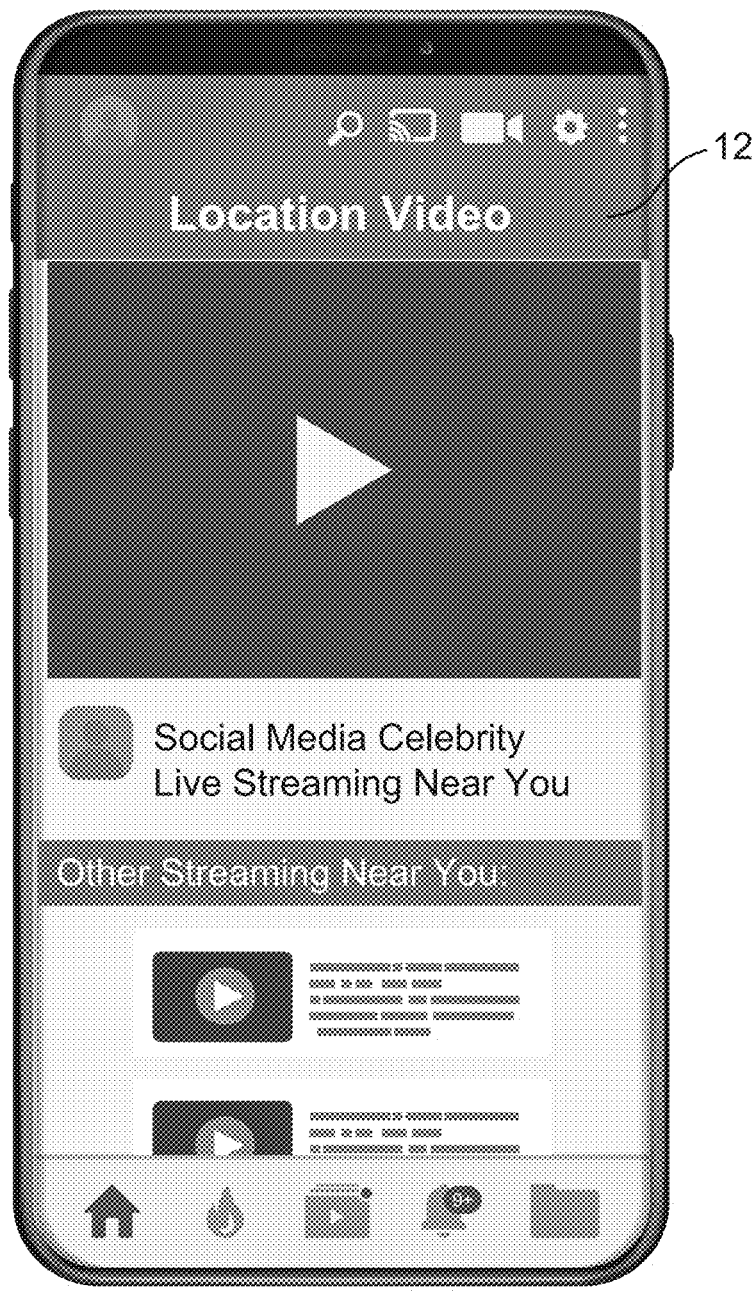
FIG. 13C depicts a user computing device of a location based video system according to an embodiment.

Referring to FIGS. 13A-13C, the system 10 may operate to provide live streaming location tagged videos. The system 10 includes the server operating the algorithm as described above to locate live streams from particular social media celebrities followed by the user in a social media platform, or a particular social media celebrity that the user has watched a plurality of videos from the particular social media celebrity. The server 10 may be programmed to send a notification to the user computing device 12, as shown in FIG. 13A, to alert the user that the social media celebrity is live streaming within a predetermined distance of the user computing device 12. In embodiments, the server 14 may send the user computing device a user interface a map showing the location of the live streaming location tagged video of the social media celebrity as can be seen in FIG. 13B. This allows fans of the social media celebrity to go to the location, or allows the user to view the live stream as depicted in FIG. 13C.

Embodiments may be available on or through the internet, such as through domain names reserved and owned by Applicant that include quickvid.live, vidnextdoor.com, vidhere.co, vidclip.app, vidtok.live, tikvid.live, vidvid.live, videohistory.net, historynextdoor.com, videonextdoor.com, gpsvideo.co, backyardvideo.net, videomyworld.com, findlocalvideo.com, videoneighborhood.org, youtubehere.com, youtubingme.com, youtubemyworld.com, youtubehistory-.org or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A location based video system comprising:
a server having a memory storing user information; and
a user computing device coupled to the server, the user computing device operating an application to couple the user computing device to the server and to provide access to the location based video system, wherein the server is programmed to:
receive location information from the user computing device;
determine a predetermined distance from the user computing device for searching for location tagged video content within the predetermined distance from the user computing device;
retrieve from an Internet source using artificial intelligence software the location tagged video content within the predetermined distance from the user computing device;
send for display on the user computing device, the location tagged video content retrieved for selection by the user; and
automatically send instruction to stream the location tagged video content on the user computing device through a network connection, in response to receiving a selection of the location tagged video content from the user computing device.

2. The system of claim 1, further comprising customizing the location tagged video content to correspond to previously entered user preferences in order to correspond the location tagged video content playing on the user computing device with the user likes.

3. The system of claim 1, wherein the location tagged video content comprises videos from a single online video system.

4. The system of claim 1, wherein the location tagged video comprises videos from a plurality of sources of online videos.

5. The system of claim 4, wherein the plurality of sources of online videos include video platforms, social media platforms, or combinations of video platforms and social media platforms.

6. The system of claim 1, wherein the server programmed to send for display on the user computing device, the location tagged video content retrieved for selection by the user comprises a push notification from the server to the user computing device.

7. A method of using a location based video system comprising:
    sending location information from a user computing device to a server;
    determining, by the server, a predetermined distance from the user computing device for searching for location tagged video content within the predetermined distance from the user computing device;
    retrieving, by the server from an Internet source using artificial intelligence software, the location tagged video content within the predetermined distance from the user computing device;
    sending, by the server, a user interface for display on the user computing device comprising the location tagged video content retrieved for selection by the user; and
    automatically streaming the location tagged video content on the user computing device through a network connection, in response to a selection of the location tagged video content through the user computing device.

8. The method of claim 7, further comprising customizing the location tagged video content to correspond to previously entered user preferences in order to correspond the location tagged video content playing on the user computing device with the user likes.

9. The method of claim 7, wherein the location tagged video content comprises videos from a single online video system.

10. The method of claim 7, wherein the location tagged video comprises videos from a plurality of sources of online videos.

11. The method of claim 10, wherein the plurality of sources of online videos include video platforms, social media platforms, or combinations of video platforms and social media platforms.

12. The method of claim 11, wherein sending, by the server, the user interface for display on the user computing device comprising the location tagged video content retrieved for selection by the user comprises a push notification from the server to the user computing device.

* * * * *